May 26, 1964     L. M. HUBBY     3,134,539
PERIODIC RATIO COMPUTER

Filed Feb. 2, 1962     3 Sheets-Sheet 1

May 26, 1964
L. M. HUBBY
3,134,539
PERIODIC RATIO COMPUTER
Filed Feb. 2, 1962
3 Sheets-Sheet 2
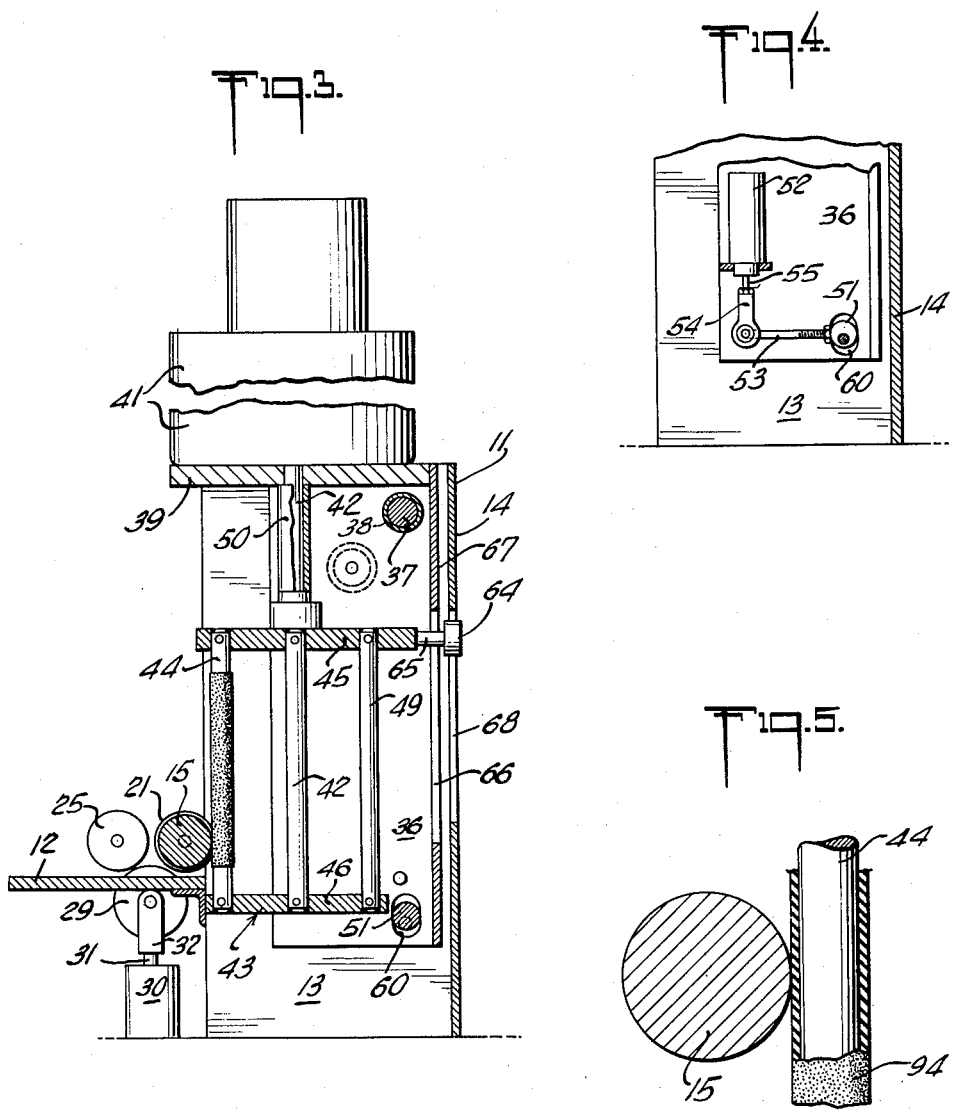

May 26, 1964  L. M. HUBBY  3,134,539
PERIODIC RATIO COMPUTER
Filed Feb. 2, 1962  3 Sheets-Sheet 3
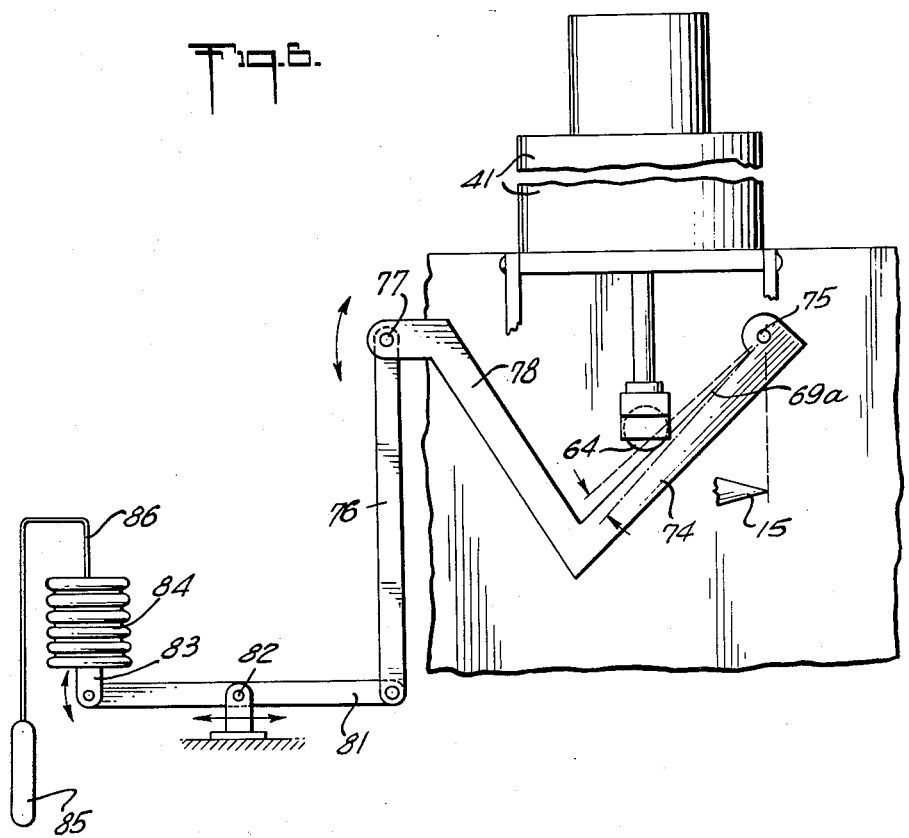

United States Patent Office 3,134,539
Patented May 26, 1964

3,134,539
PERIODIC RATIO COMPUTER
Laurence M. Hubby, Bellaire, Tex., assignor to Texaco Inc., New York, N.Y., a corporation of Delaware
Filed Feb. 2, 1962, Ser. No. 170,721
5 Claims. (Cl. 235—61)

This invention is concerned with a mechanical type of ratio computer. More specifically the ratio computer involved is like that disclosed in a copending application Serial No. 815,132 filed May 22, 1959, now Patent No. 3,081,636. Although the application of the computer as set forth in that application is for use in connection with measuring the volume of oil in an oil-water mixture, it will be clear to anyone skilled in the art that a computer in accordance with this invention may have other and different uses as well.

The need for a ratio computer according to this invention has arisen in connection with measuring of the quantity delivered in connection with crude oil production, where the oil being produced and delivered may contain some water mixed with the oil output. Since the oil being delivered is the commodity of value it is important to measure the volume of fluid delivered in terms of the quantity of oil only. In order to do this a ratio is involved with respect to the amount of oil in the total oil-water mixture, and where a batch type of volume measurement is carried out this invention is especially valuable in providing a direct ratio measurement such that the output is given directly in terms of the oil only.

Consequently it is an object of this invention to provide an improved system for computing the ratio of two quantities where the quantities are available in terms of separate signals that may be applied in sequence.

It is another object of this invention to provide a ratio computer system in accordance with the foregoing, which also includes a temperature compensation feature such that the resulting measurements are continuously and automatically compensated for temperature changes in the fluid or other material being measured.

Another object of this invention is to provide a ratio computer system similar to that disclosed in the aforementioned copending application but having an improved and simplified structure for causing the first of two quantities to translate a drive member along the slant distance of a cone for a corresponding distance. This improved structure includes a cam arrangement that may be incorporated in the structure of the computer system in a novel albeit simple and easy manner.

Briefly, the invention relates to a combination for use in a ratio computer for periodically measuring the ratio of two quantities. Such combination includes a cone having the proportions thereof such that the circumference at any point along the slant distance from the apex is equal to a predetermined function of the said slant distance. In addition the combination comprises a tangential transverse cone drive member adapted to rotate said cone upon activation of the drive member, and cam means for translating said drive member along said slant distance for an amount proportional to one of said quantities. The combination additionally comprises means for activating said drive member and means for positioning said drive member following activation thereof for an amount proportional to the other of said quantities, all whereby the said cone is periodically rotated an amount proportional to a predetermined function of the ratio of said two quantities.

Again briefly, the invention may be described as a ratio computer for use in connection with a system wherein two quantities are each sequentially represented by a signal having an amplitude proportional thereto. The foregoing computer comprises a signal transducer for providing a positioning movement proportional to the amplitude of each of said quantity signals, a cone having the proportions thereof such that the circumference at any point along the slant distance from the apex is equal to a predetermined function of said slant distance and a tangential transverse cone drive member connected to said transducer for longitudinal movement according to said signals. The computer also comprises a cam follower carried by said member, and an adjustable cam surface for cooperating with said cam follower to cause positioning of said cone drive member parallel to said slant distance upon the first signal movement. In addition the computer comprises temperature responsive means for adjusting said cam surface in order to provide a temperature compensation in the output of the ratio computer and means for activating said cone drive member prior to the movement according to said second signal whereby said cone will be rotated an amount proportional to a function of the ratio of said two quantities.

The foregoing and other objects and benefits of the invention are set forth in some detail and are described below with reference to the illustrations of the drawings, wherein:

FIGURE 3 is a right end view partly in cross section, showing the same ratio computer unit;

FIGURE 4 is a detail elevation partly in cross section, taken along the line 4—4 of FIGURE 2 looking in the direction of the arrows and showing the activating mechansim for controlling movement of the cone driving element into contact with the surface of the cone;

FIGURE 5 is an enlarged detail cross sectional view showing the structure of the cone drive rod, as it is in frictional contact with the surface of the cone; and FIGURE 6 is a schematic illustration indicating the elements involved in a temperature compensating arrangement that is applicable to the ratio computer structure of FIGURES 1-5.

Figure 1:
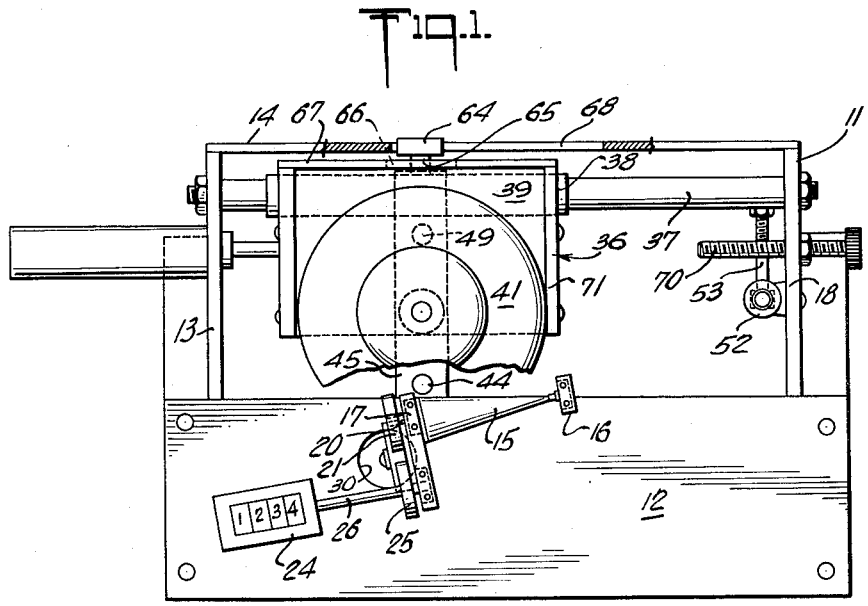
FIGURE 1 is a plan view partly broken away in cross section, showing the complete ratio computer structure.

Referring to FIGURES 1-5 it is pointed out that the structure of the ratio computer unit here illustrated is in many respects quite similar to the structure of a ratio computer shown and described in the aforementioned copending application Serial No. 815,132. However, in the subject ratio computer structure there is employed an improved cam means that is employed for determining the first transverse movement of the cone drive elements which movement takes place along the slant distance from the apex of the cone. In addition to the foregoing improved structure employed in this invention, it is to be noted that a temperature compensation arrangement may be incorporated in connection with the cam means structure so that the output readings of the ratio computer may be continuously compensated for temperature effects.

It will be observed that there is a framework 11 that includes panels 13, 14 and 18 on three sides thereof and has attached across the open end a horizontal apron 12 upon which is mounted a cone 15 that has bearings 16 and 17 therefor to provide for free rotation thereof. The bearing 16 is situated at the tip or apex end of the cone 15, while an axial shaft 20 at the base of the cone has a pulley 21 securely attached thereto in any convenient manner, e.g. by being keyed onto the shaft 20. There is a rotation counter 24 that has a pulley 25 attached to a shaft 26 for driving the counter 24. In order to make a driving connection between the pulley 21 of cone 15 and the pulley 25 of the counter 24, there is a clutch arrangement which includes a piston activated roller 29 that is placed into frictional engagement with both of the pulleys 21 and 25 whenever a driving connection is desired between the cone 15 and the counter 24. Such frictional driving connection is effected by means of a cylinder and piston unit 30 that activates a piston rod 31 which has a yoke 32 thereon that in turn supports the roller 29 in a freely rotatable manner.

Within the framework 11 there is a carriage 36 that is slidably supported in a limited pivotal manner from an upper transverse rod 37. Rod 37 has reduced diameter ends that are threaded to receive nuts as illustrated so that the rod acts as a brace between the panels 13 and 18 as well as a support for the carriage 36. The carriage 36 has a sleeve 38 integrally attached thereto near the upper right hand corner of the carriage (when viewed as shown in FIG. 3) and this sleeve is freely slidable longitudinally along the rod 37 as well as being rotatable thereon.

Figure 2:
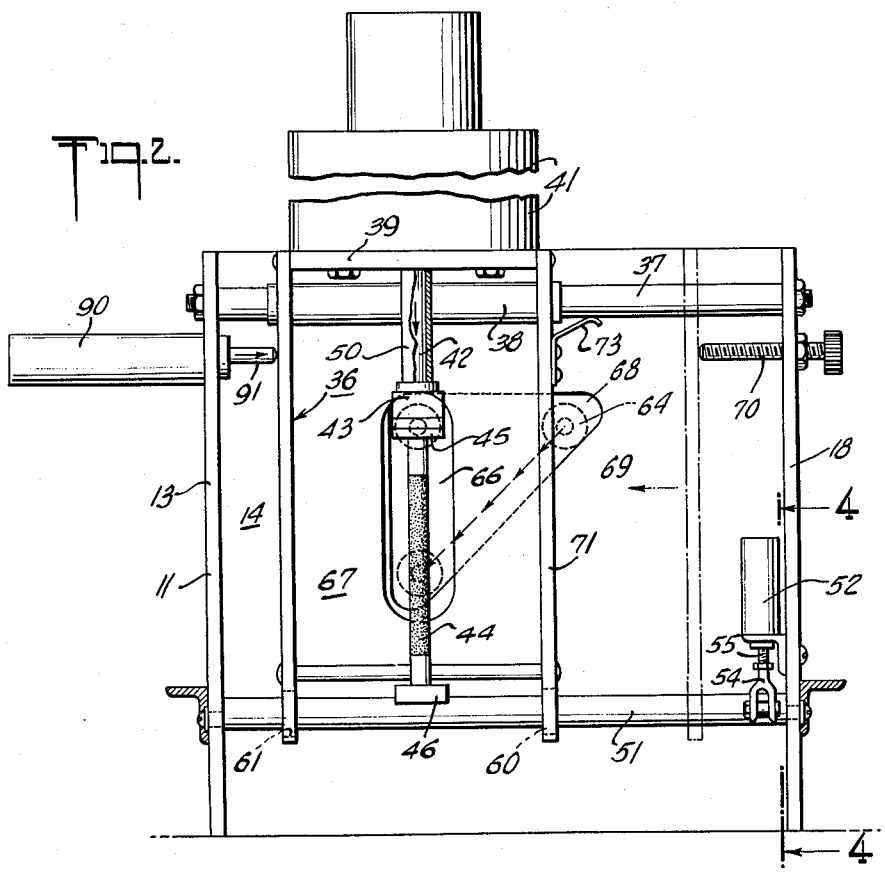
FIGURE 2 is a front-side view largely in elevation, showing the same ratio computer unit.

Fastened to a top panel 39 of carriage 36 in any convenient manner, such as by employing bolts as illustrated in FIGURE 2, there is a pneumatic positioning transducer 41 that provides for transforming pneumatic signals into longitudinal movement having an amplitude proportional to the pneumatic signal applied. This longitudinal movement is accomplished by having a piston rod 42 extend out from one end of the transducer 41. Attached to the free end of the piston rod 42 there is a cone drive member 43 that includes a transversely situated (relative to the cone) cone-drive rod 44 which is supported by the two cross arms 45 and 46. The drive member also includes another rod 49 that extends between the cross arms 45 and 46, parallel to the drive rod 44, for the purpose of adding stiffness and support. The drive mechanism is thus positioned by reciprocation of the piston rod 42 from a zero position (as illustrated in FIGURES 2 and 3) downward (as viewed in the FIGURES 1–3 illustration). The at-rest or zero position is determined by a stop sleeve 50.

The ratio of the two quantities that are to be compared is measured by the rotation of cone 15 which takes place upon the second application of a signal to transducer 41. At that time the clutch, that includes roller 29, is activated to connect the output pulley 21 of cone 15 with the pulley 25 carried by the counter 24. During the first signal application drive rod 44 is not in contact with the surface of the cone 15. This is because carriage 36 is sufficiently pivoted counterclockwise (as viewed in FIGURE 3) about support rod 37. Such pivotal position of the carriage 36 is controlled by the rotational position of an eccentric rod 51 that is controlled in its rotational position by a cylinder and piston 52 that is connected to the eccentric rod 51 by a crank arm 53 which in turn is pivotally connected via a flexible link type yoke 54 carried on the extremity of a piston rod 55. In this manner, when it is desired to activate the drive rod 44 into frictional driving engagement with the surface of the cone 15, the cylinder and piston 52 will be energized to cause its piston rod 55 to be extended and thus to rotate the eccentric rod 51 via the crank arm connection 53. The rotation of eccentric rod 51 acts in connection with oblong slots 60 and 61 that are situated in the two side panels of carriage 36 near the lower right hand corner of each, when viewed as shown in FIGURE 3. Such eccentric action causes the carriage 36 to pivot about the axis of support rod 37 by reason of the free sliding sleeve arrangement which supports the carriage 36 on the rod 37.

As the first quantity representing signal is applied to the transducer 41, and the piston rod 42 is extended in accordance therewith, there is a cam action which takes place. Such cam action involves a cam follower 64 that is a roller attached to the end of a supporting shaft 65 which is integrally attached to the inside end of the upper cross arm 45 of the drive rod support structure. In the back panel 14 of framework 11 there is a triangular shaped opening 68 which has a forty-five degree sloping cam surface 69 as the hypotenuse thereof. It will be observed that when the carriage 36 is in its starting or zero position prior to the application of a first signal (representing one of the two quantities) cam follower or roller 64 is in contact with the cam surface 69 near the upper end thereof. When the carriage 36 is in such zero or starting position, end panel 71 thereof is in contact with an adjustable stop screw 70. This is indicated by dashed lines in the FIGURE 2 illustration. Then as the piston rod 42 is extended, the cam follower 64 is moved vertically downward and thus causes a horizontal sliding or positioning movement of the carriage 36 by reason of the sloped cam surface 69. Free downward movement of the cam follower roller 64 and its supporting shaft 65 is permitted, relative to the carriage 36, by reason of a vertical slot or opening 66 in back panel 67 of the carriage.

It will be observed that there is a friction spring 73 employed in order to avoid any movement of the carriage 36 beyond that caused by the first signal positioning of piston rod 42 and associated elements. As shown in FIGURE 2, friction spring 73 is attached to one side of the carriage 36 with the free end of the spring resting under spring force against support rod 37.

After application of the first signal, the piston rod 42 is returned to its zero or starting position. Then the drive rod 44 is activated into frictional engagement (in a tangential manner transversely) relative to the cone 15 by application of a signal to the piston 52, as described above. Thereafter, with the drive rod 44 in engagement against the surface of the cone 15 (at a slant distance from the apex of the cone determined by the first signal) application of the second signal to transducer 41 will cause the piston rod 42 to be extended once more. This time, as the extension takes place drive rod 44 is vertically moved across the surface of the cone 15 in a tangential transverse manner so as to cause rotation thereof for an amount that depends upon the dimensions of the cone 15.

It is to be noted that the ratio measured in terms of output rotation, as determined by the rotation of cone 15, will be such as to produce rotation which is a predetermined function of the slant distance from the apex of the cone. As a clarifying example of the foregoing, it is to be noted that a preferable construction for the cone proportions is such that the circumference of the cone at any given location is equal to the slant distance from the apex of the cone, to that location. With such proportions for the cone, the ratio (output rotation) is clearly a direct one which provides the amount of rotation directly proportional to the ratio of the second signal to the first signal. In other words, by applying as the first signal the quantity that is to be the denominator of the measured ratio, and applying as the second signal the quantity which is to be the numerator of the ratio; the slant distance which the apparatus will move along the surface of the cone will be a direct measure of the amplitude of the denominator. Consequently when the second signal is applied, after activation of the drive rod arrangement, the numerator signal will then cause rotation of the cone which rotation is a direct indication of the ratio measured, i.e. the size of the numerator compared to the size of the denominator. Thus, for example, if the ratio is 1:1, it does not matter how far the first signal positions the carriage, so long as the second signal is the same amplitude. This is because such conditions will cause a single (one revolution) rotation of the cone 15 (under the assumed proportions in the cone structure, i.e. having the circumference at any point equal to the slant distance from the apex).

Referring to FIGURE 6 it is to be observed that there is indicated a schematic showing for providing temperature compensation, to be applied to the ratio computer structure as illustrated in the other figures of the drawings. It will be appreciated that the elements shown provide for the necessary arrangement, without necessarily showing the actual structure (insofar as design is concerned) that would be used.

Thus there is shown an arrangement such that the cam surface 69 (FIGURES 1, 2 and 3) is illustrated in FIG- URE 6 as a pivoted arm 74 having an edge 69a as the cam surface with which follower 64 is in contact. Arm 74 has a pivot 75 therefor that is situated transversely in line with the apex of the cone 15. It will be appreciated that the necessary offset for the pivot structure, as may be required to provide clearance for the cam follower 64 will be taken care of in any feasible manner (not shown).

The arm 74 is connected for pivotal adjustment via a lever arm arrangement, e.g. by having a connecting link 76 that is pivoted at a stud, or pivot shaft 77 carried on an integral connecting part for the arm 74. The latter is shown as a cross arm member 78. The other end of link 76 is pivotally attached to one end of a lever arm 81 that has a horizontally adjustable fulcrum 82 near the center thereof. At the other extremity of the lever arm 81 there is pivotally attached a bellows output link 83 that is the connector for a bellows 84 of a temperature sensitive unit. The unit includes a temperature sensitive bulb 85 that is connected to the bellows 84 by means of a standard type of capillary tube 86.

It will be clear that, in operation the temperature compensating arrangement acts under control of the temperature sensitive elements to rock the lever arm 81 about its pivot point or fulcrum 82 and so rotate the pivoted arm 74 about its pivot point 75 so as to vary the slope of the cam surface 69a thereof. In this manner, as temperature of the fluid under measurement is varied, the slope of the cam surface 69a is changed and consequently the slant distance along the cone 15 that is created by the application of the first signal, is varied under control of the temperature at sensing bulb 85. In this manner a temperature compensated output rotation at the counter 24 (FIGURE 1) will be provided so that the ratio reading given is automatically corrected for temperature effects.

It may be observed here that any feasible arrangement for obtaining the results desired with the temperature compensating cam slope adjustment, may be employed, as already indicated. One such arrangement might provide for pivotally mounting (not shown) the back panel 14 and for attaching a temperature sensitive unit directly thereto in order to vary the slope in a manner such as that indicated in FIGURE 6.

*Operation*

It is pointed out that in operation the ratio computer according to the invention acts in a periodic manner so as to make the desired ratio determination by means of a cycle that is carried out in order to apply sequentially the two signals representing quantities that are to have the ratio therebetween measured. The cyclic operation is like that described in the aforementioned copending application Serial No. 815,132, and may be described briefly as follows. Each cycle commences with the carriage 36 in its starting position against the stop screw 70, i.e. against the right hand end of the travel of carriage 36 when viewed as shown in FIGURES 1 and 2. The starting position is obtained prior to the beginning of each cycle by applying a fluid signal to a cylinder 90 that has a piston rod 91 which bears against one side of the carriage 36. Therefore, when piston rod 91 is extended, the carriage 36 will be moved to its starting position against the stop screw under the damping restraint of the friction effect of friction spring 73.

After the starting position has been established, the first signal is applied to the transducer 41 which will cause extension of the piston rod 42 as previously described. This will cause the carriage 36 to slide along its support rod 37 away from the stop 70 for a distance depending upon the amplitude of the first signal (and as varied by temperature controlled slope of cam surface 69a). Then after the termination of the first signal, piston rod 42 will be withdrawn to its zero or starting position (as determined by the sleeve 50). Next, an activation signal will be applied to the piston 52 so as to cause rotation of the carriage 36 about its support rod 37 and thus place the drive rod 44 into frictional engagement with the surface of the cone 15. The next step in a cycle will be application of the second signal to transducer 41. This will once more cause the piston rod 42 to extend, for a distance depending upon the amplitude of the second signal this time; and during this action, since the drive rod 42 is in driving frictional engagement with the surface of the cone 15, the cone will be rotated an amount depending upon the ratio of the second signal to that of the first signal. Such output rotation of the cone 15 will be transmitted to the counter 24 since the clutch arrangement will be then engaged to cause rotation of the counter.

Referring to FIGURE 5 it is to be noted that the arrangement for providing frictional driving action between drive rod 44 and the surface of the cone 15, preferably includes a relatively soft surface material on the drive rod 44, e.g. a pebbled rubber-surface sleeve 94 illustrated. This arrangement allows for better friction and for the slight difference in distance at the ends of the drive rod, i.e. from the surface of the cone 15 to the tangential surface of rod 44. The latter is the difference in distance at the two ends of the drive rod 44 that is caused by the pivotal arrangement of carriage 36 (about supporting rod 37).

While a particular embodiment of the invention has been illustrated in considerable detail in accordance with the applicable statutes, this is not to be taken as in any way limiting the invention but merely as being descriptive thereof.

I claim:

1. A ratio computer for use in connection with a system wherein two quantities are each sequentially represented by a signal having an amplitude proportional thereto, said computer comprising a signal transducer for providing a positioning movement proportional to the amplitude of each of said quantity signals, a cone having the proportions thereof such that the circumference at any point along the slant distance from the apex is equal to a predetermined function of said slant distance, a tangential transverse cone drive member connected to said transducer for longitudinal movement according to said signals, a cam follower carried by said member, an adjustable cam surface for cooperating with said cam follower to cause positioning of said cone drive member parallel to said slant distance upon the first signal movement, temperature responsive means for adjusting said cam surface in order to provide a temperature compensation in the output of the ratio computer, means for activating said cone drive member into driving relationship with said cone prior to the movement according to said second signal whereby said cone will be rotated an amount proportional to a function of the ratio of said two quantities.

2. The invention according to claim 1 wherein said temperature responsive means includes a temperature sensitive element and an adjustable linkage connecting said sensitive element to said cam surface.

3. The invention according to claim 2 wherein said adjustable cam surface includes a pivot located transversely offset from the apex of said cone, and wherein said adjustable linkage provides for pivoting the same cam surface in accordance with the temperature as indicated by said sensitive element.

4. In a ratio computer for periodically measuring the ratio of two quantities, in combination, a cone having the proportions thereof such that the circumference at any point along the slant distance from the apex is equal to a predetermined function of the said slant distance, a cone-drive member adapted to rotate said cone upon activation of the drive member, means for mounting said member in a tangential transverse manner relative to said cone, said mounting means being translatable parallel to said slant distance, a transducer for receiving signals in accordance with said two quantities, said transducer being adapted to cause longitudinal positioning of said member according to said received signals, a cam follower carried by said drive member, a cam surface co-operating with said follower to cause translation of said mounting means along the slant distance upon application of the first of said quantities, means for activating said drive member into driving relationship with said cone, said other quantity signal positioning said member in accordance therewith, whereby said cone is periodically rotated an amount proportional to a predetermined function of the ratio of said two quantities.

5. The invention according to claim 4 further including a temperature responsive means for adjusting said cam surface to provide a temperature compensation of the output ratio.

References Cited in the file of this patent

UNITED STATES PATENTS

| | | |
|---|---|---|
| 1,432,375 | Witt | Oct. 17, 1922 |
| 2,222,551 | Ziebolz | Nov. 19, 1940 |